United States Patent
Minamino et al.

(10) Patent No.: US 8,140,472 B2
(45) Date of Patent: Mar. 20, 2012

(54) METHOD FOR ALLOCATING LOGICAL UNIT INSIDE STORAGE SYSTEM TO LOGICAL VOLUME AND STORAGE CONTROLLER

(75) Inventors: Kumiko Minamino, Yokohama (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 697 days.

(21) Appl. No.: 12/234,780

(22) Filed: Sep. 22, 2008

(65) Prior Publication Data

US 2010/0023566 A1 Jan. 28, 2010

(30) Foreign Application Priority Data

Jul. 23, 2008 (JP) ................. 2008-189784

(51) Int. Cl.
G06F 7/00 (2006.01)
G06F 17/00 (2006.01)
(52) U.S. Cl. ...................... 707/609; 711/100
(58) Field of Classification Search .......... 711/114, 711/170, 100; 707/609
See application file for complete search history.

(56) References Cited

U.S. PATENT DOCUMENTS

2007/0055820 A1* 3/2007 Eguchi et al. ............. 711/114
2007/0245114 A1* 10/2007 Kakui et al. .............. 711/170

FOREIGN PATENT DOCUMENTS

JP 2007-310861 11/2007

OTHER PUBLICATIONS

"Efficient Remote Block-level I/O over an RDMA-capable NIC"; Manolis Marazakis, Konstantinos Xinidis, Vassilis Papaefstathiou, Angelos Bilas; Greece; ACM; Jun. 28-30, 2006.*

* cited by examiner

Primary Examiner — Giovanna Colan
(74) Attorney, Agent, or Firm — Antonelli, Terry, Stout & Kraus, LLP.

(57) ABSTRACT

A storage controller comprises a creation module that creates a logical volume, a management module that manages a plurality of types of logical units inside a storage system, a measurement module that measures an access characteristic, which is a characteristic related to an access to the logical volume, a decision module that decides the type of a logical unit to be allocated to the logical volume based on the measured access characteristic, and an allocation module that allocates to the logical volume a logical unit, of the plurality of types of logical units, of the type decided by the decision module.

15 Claims, 15 Drawing Sheets

FIG. 5

252 LU MANAGEMENT TABLE

| 511 | 512 | 513 | 514 | 515 | 516 |
| --- | --- | --- | --- | --- | --- |
| LU IDENTIFICATION INFORMATION | STORAGE TYPE | STORAGE MODE TYPE | SIZE [GB] | STATUS | CREATION DATE |
| LU-1 | DISK | AOU | XXX | UNALLOCATED | H20.1.1 |
| LU-2 | DISK | AOU | YYY | UNALLOCATED | H20.2.1 |
| LU-3 | FLASH | NON-AOU | ZZZ | UNALLOCATED | H20.3.1 |
| : | : | : | : | : | : |

FIG. 6

226 MAPPING TABLE

| 521 | 522 | 523 |
| --- | --- | --- |
| LOGICAL VOLUME START/END ADDRESSES | LU IDENTIFICATION INFORMATION | LU START/END ADDRESSES |
| 0 ~ 100 | LU-1 | 0 ~ 100 |
| 101 ~ | LU-2 | 0 ~ |
| : | : | : |
| 1XX ~ | UNALLOCATED | UNALLOCATED |

FIG. 7

225 LOGICAL VOLUME MANAGEMENT TABLE

| 531 | 532 | 533 |
| --- | --- | --- |
| LOGICAL VOLUME IDENTIFICATION INFORMATION | MAXIMUM SIZE | MAPPING TABLE NAME |
| LV01 | 100GB | AAA |
| LV02 | 200GB | BBB |
| : | : | : |

242 i-NODE TABLE

| i-NODE NUMBER (541) | OWNER (542) | ACCESS RIGHTS (543) | SIZE (544) | STORAGE-DESTINATION ADDRESS 1 (545) | STORAGE-DESTINATION ADDRESS 2 | STORAGE-DESTINATION ADDRESS 3 |
|---|---|---|---|---|---|---|
| : | : | : | : | : | : | : |
| 100 | user001 | u:g:w rxw rxw rxw | 1000KB | 0-100-3 | 3-200-2 | 5-250-5 |
| : | : | : | : | : | : | : |

FIG. 10

61 ACCESS LOG

| DATE TIME 611 | FILE PATHNAME 612 | ACCESS TYPE 613 |
|---|---|---|
| 2008/5/12 00:00:00 | /home/user01/a.txt | read |
| 2008/5/12 01:00:10 | /home/user02/b.txt | write |
| 2008/5/12 01:10:10 | /home/user03/c.txt | read |
| ⋮ | ⋮ | ⋮ |

FIG. 11

62 READ/WRITE COMPARISON INFORMATION

```
<NUMBER OF READ/WRITE>
 NUMBER OF READS:2000   ～ 621
 NUMBER OF WRITES:800   ～ 622

<TOTAL READ/WRTIE CAPACITY>
 READ SIZE:12300 MB    ～ 623
 WRITE SIZE:5131 MB    ～ 624
```

<READ/WRITE CAPACITY BY EXTENSION>

| EXTENSION | NUMBER | READ SIZE 625 | WRITE SIZE 626 | READ SIZE 627 | WRITE SIZE 628 |
|---|---|---|---|---|---|
| html | 1000 | 500 | 10 | 150MB | 10MB |
| jpg | 150 | 300 | 20 | 200MB | 5MB |
| mp3 | 20 | 300 | 10 | 50MB | 1MB |
| pdf | 200 | 200 | 50 | ⋮ | ⋮ |
| ⋮ | ⋮ | ⋮ | ⋮ | | |
| OTHER | 3000 | 500 | 100 | XXGB | YYGB |

(629)

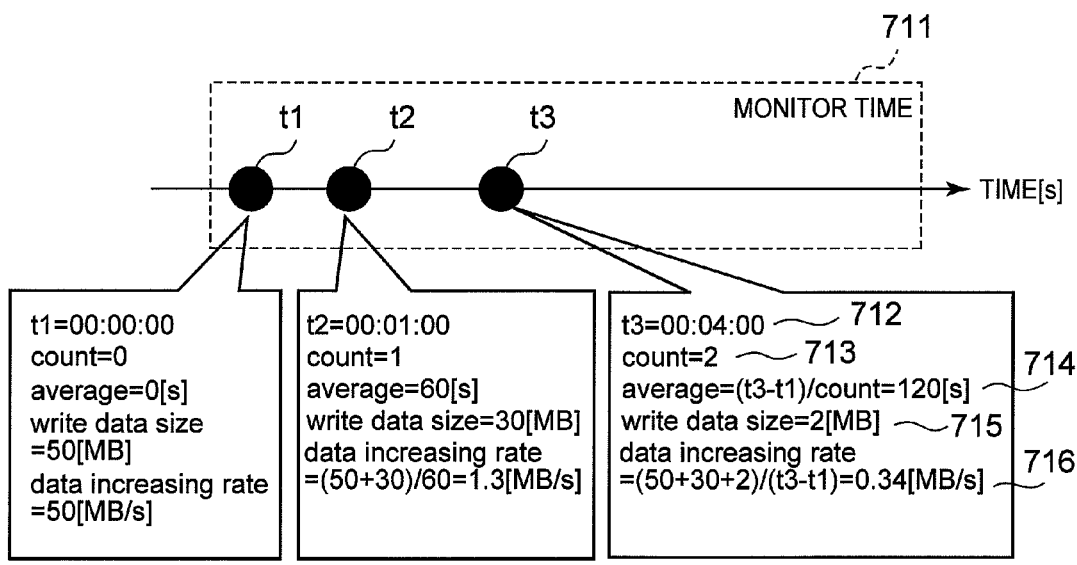

METHOD FOR ALLOCATING LOGICAL UNIT INSIDE STORAGE SYSTEM TO LOGICAL VOLUME AND STORAGE CONTROLLER

CROSS-REFERENCE TO PRIOR APPLICATION

This application relates to and claims the benefit of priority from Japanese Patent Application number 2008-189784, filed on Jul. 23, 2008 the entire disclosure of which is incorporated herein by reference.

BACKGROUND OF THE INVENTION

1. Field of the Invention

The present invention relates to the allocation of a Logical Unit (LU) from inside a storage system to a logical volume inside a storage controller.

2. Description of the Related Art

A storage system comprising a virtual logical storage device by which real capacity is dynamically expanded has been known for some time (for example, Japanese Patent Laid-open No. 2007-310861). In accordance with this kind of technology, when a write is generated to a virtual area, of a plurality of virtual areas comprising a virtual logical storage device, for which a real area has not been allocated, a non-allocated real area from among a plurality of real areas is allocated to this virtual area, and the write-targeted data is written to this real area.

In order from the higher level to the lower level, the storage hierarchy inside a storage system in general constitutes an LU, a logical storage device, and a physical storage device. As one kind of logical storage device, there is the above-mentioned virtual logical storage device. For example, when a write request specifying an LU is received by the storage system, if a virtual logical storage device has been allocated to the specified LU, a write is generated to this virtual logical storage device.

The LU is allocated to a logical volume managed by a storage controller. The storage controller, for example, can be a NAS (Network Attached Storage). The NAS provides the logical volume (specifically, a file system space corresponding to the logical volume), to which the LU (Logical Unit) provided by the storage system has been allocated, to a client.

The types of LU vary depending on the type of physical storage device that constitutes the basis of the allocated logical storage device (for example, a hard disk drive (HDD) or flash memory drive), and different storage modes (in other words, the type of logical storage device that has been allocated, for example, the above-mentioned virtual logical storage device or an ordinary logical storage device). The type of LU allocated to a logical volume will impact the response speed at access and the utilization efficiency of the storage resource. Therefore, it is preferable that the characteristics of the type of LU allocated to the logical volume conform to the characteristics related to an access from a client to this logical volume (for example, the type of file to be accessed, whether read accesses or write accesses are more numerous, and so forth).

However, at the time a logical volume is created, the access characteristics relative to this logical volume are unknown, and therefore, there is no way of knowing what type of LU should be allocated to the logical volume. Therefore, for example, there are times when the type of LU allocated to the logical volume does not conform to the actual access characteristics for this logical volume. A case like this is troublesome in that there is no option other than to continue using the type of LU that does not conform to the access characteristics for the logical volume.

SUMMARY OF THE INVENTION

Accordingly, an object of the present invention is to make it possible to allocate a type of LU that conforms to the access characteristics of a logical volume.

A storage controller comprises a creation module that creates a logical volume; a management module that manages a plurality of types of logical units inside a storage system; a measurement module that measures an access characteristic, which is a characteristic related to an access to the logical volume; a decision module that decides the type of logical unit to be allocated to the logical volume based on the measured access characteristic; and an allocation module that allocates to the logical volume the type of logical unit that has been decided by the above-mentioned decision module from among the plurality of types of logical units.

The storage controller can exist outside the storage system, or can reside inside the storage system. The storage controller in the case of the former, for example, is a NAS, and in the case of the latter is a NAS microprocessor mounted to a circuit board inside the storage system.

At least one of the above-mentioned creation module, management module, decision module and allocation module can be constructed using hardware, a computer program, or a combination thereof (for example, one module can be realized via a computer program, and the remaining modules can be realized via hardware). A computer program is executed by being read into a prescribed processor. Further, when information processing is carried out by a computer program being read into the processor, a storage region that exists in a hardware resource such as a memory can be used as needed. Further, the computer program can be installed into a computer from a CD-ROM or other such recording medium, or can be downloaded to the computer via a communication network.

BRIEF DESCRIPTION OF THE DRAWINGS

FIG. 5 is a diagram showing an example of a LU management table;

FIG. 6 is a diagram showing an example of a mapping table;

FIG. 7 is a diagram showing an example of a logical volume management table;

FIG. 10 is a diagram showing an example of an access log;

FIG. 11 is a diagram showing an example of read-write comparison information;

FIG. 12 is a diagram showing an example of a monitor time definition file;

FIG. 13 is a diagram illustrating a method for measuring the rate at which the quantity of data increases;

FIG. 14 is a diagram showing an example of data quantity increase rate information;

DESCRIPTION OF THE PREFERRED EMBODIMENTS

One embodiment of the present invention will be explained in detail below while referring to the figures. Furthermore, in the explanation of this embodiment, a sentence in which a computer program is given as the subject signifies processing that is actually carried out by the CPU, which executes the pertinent computer program.

Figure 1:
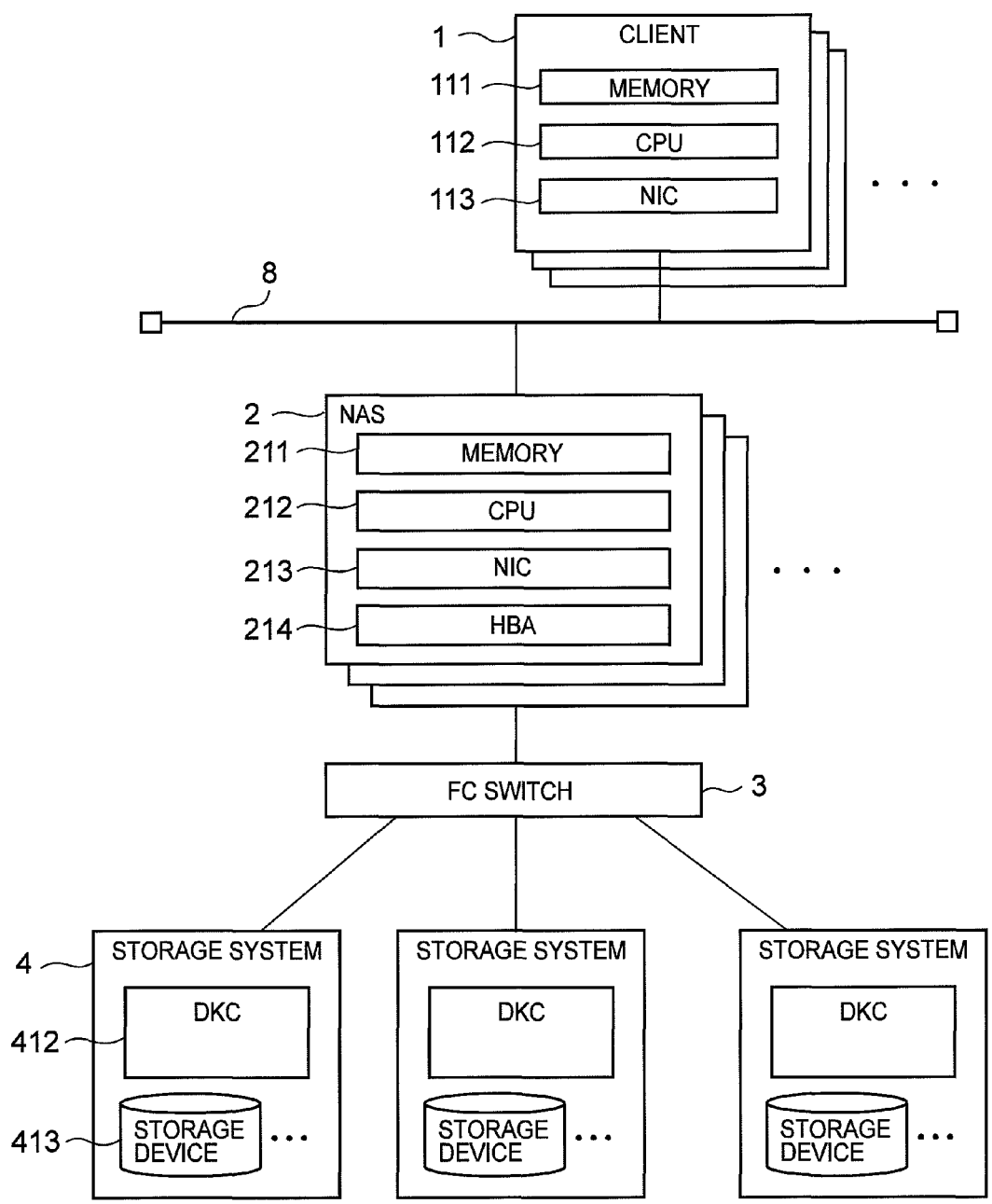
FIG. 1 is a diagram showing an example of the hardware configuration of a computer system related to this embodiment.

FIG. 1 is a diagram showing an example of the hardware configuration of a computer system related to this embodiment.

One or more clients 1 and one or more NAS 2 are interconnected by way of a communication network 8 (for example, a LAN (Local Area Network)). The NAS 2 and one or more storage systems 4 are interconnected by way of an FC switch 3.

The client 1 is a computer that accesses a file system space corresponding to a logical volume provided by the NAS 2. The client 1, for example, reads out a file stored in the file system space, or writes a file to the file system space. The client 1, for example, comprises a memory 111, CPU 112, and NIC (Network Interface Card) 113. The NIC 113 is a device for carrying out data communications with the NAS 2. In this embodiment, since the file system space corresponds on a one-to-one basis with the logical volume, in the following explanation it is supposed that a logical volume is provided to the client 1.

The NAS 2 is a storage controller, which provides a logical volume to the client 1, and which manages a file written to the logical volume. The NAS 2, for example, comprises a memory 211, CPU 212, NIC 213, and HBA (Host Bus Adapter) 214. The NIC 213 is a device for carrying out data communications with the client 1. The HBA 214 is a device for carrying out data communications with the storage system 4.

The storage system 4, for example, can be a RAID (Redundant Arrays of Independent (or Inexpensive) Disks) system that comprises a large number of physical storage devices 413 (for example, HDD) arranged in an array. The physical storage device 413 is not limited to HDD, and can also be another kind of physical storage device (for example, a flash memory drive). A plurality of types of physical storage devices can coexist in the storage system 4. The storage system 4 comprises a DKC (Disk Controller) 412 in addition to a physical storage device 413.

The DKC 412 can carry out data communications with the NAS 2 or another storage system 4, or can exchange data with the physical storage device 413. The DKC 412, for example, is configured as a microcomputer system (for example, a circuit board) that comprises a CPU and a memory. When a write request specifying an LU is received from the NAS 2, the DKC 412, for example, temporarily stores the write-targeted data in a cache memory (not shown in the figure), and writes this data to the physical storage device 413 that constitutes the basis of the logical storage device corresponding to this LU. Further, when a read request specifying an LU is received from the NAS 2, the DKC 412 reads out the read-targeted data from the physical storage device 413 that constitutes the basis of the logical storage device corresponding to this LU, temporarily stores this read-targeted data in the cache memory, and sends the read-targeted data stored in the cache memory to the NAS 2.

Figure 2:
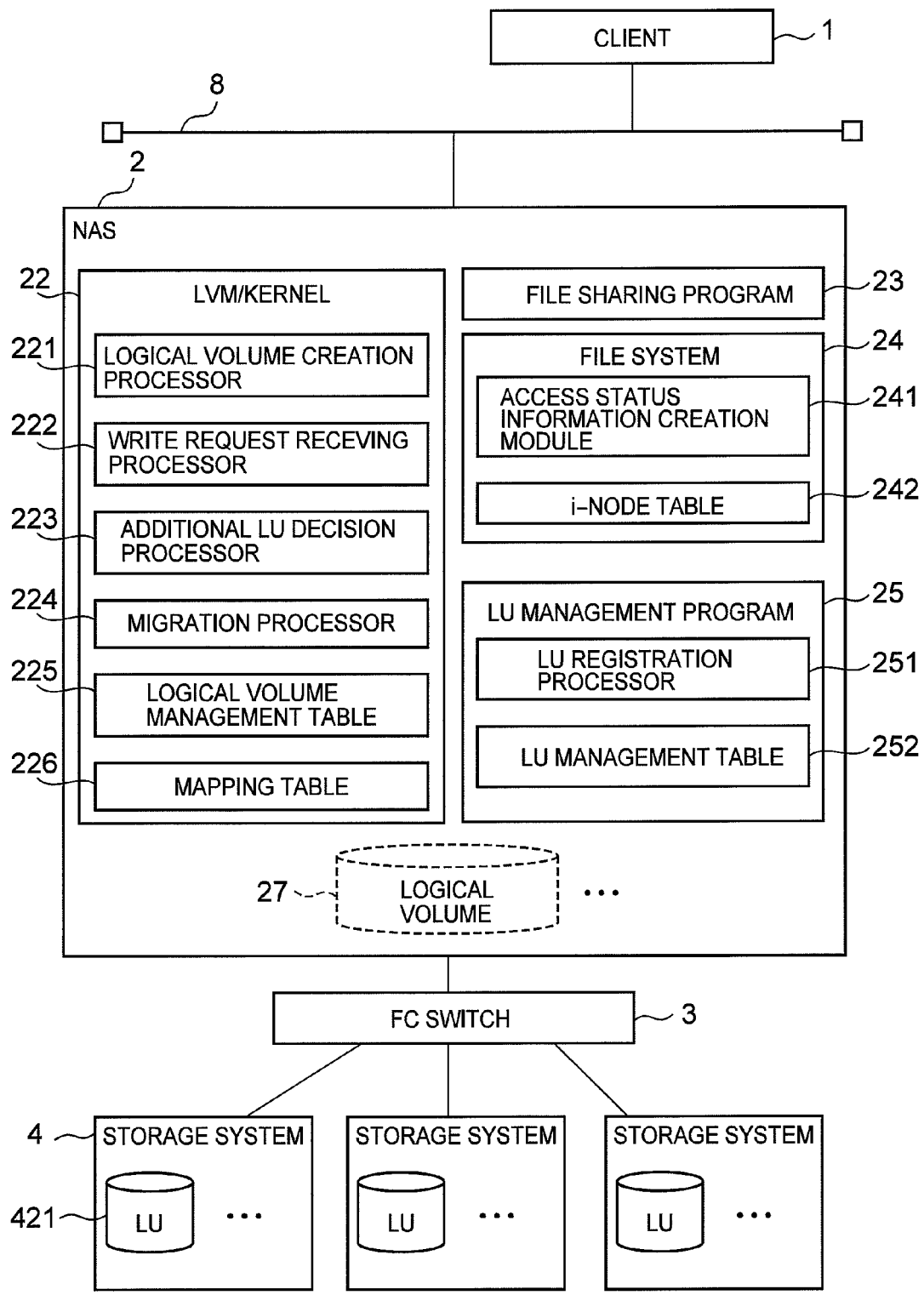
FIG. 2 is a diagram showing an example of the software configuration of the computer system related to this embodiment.

FIG. 2 is a diagram showing an example of the software configuration of the computer system related to this embodiment.

The NAS 2, for example, comprises computer programs, such as a LVM (Logical Volume Manager)/Kernel 22, a file sharing program 23, a file system 24, and a LU management program 25. These computer programs 22, 23, 24 and 25 are loaded into the memory 211 of the NAS 2, and executed by the CPU 212 of the NAS 2.

The LVM/Kernel 22 is a program that creates and manages a logical volume 27. The LVM/Kernel 22, for example, comprises sub-programs, such as a logical volume creation processor 221, a write request receiving processor 222, an additional LU decision processor 223, and a migration processor 224. Further, the LVM/Kernel 22, for example, also comprises various types of tables, such as a logical volume management table 225 and a mapping table 226. The processing carried out by the sub-programs 221, 222, 223, 224 and tables 225, 226 of the LVM/Kernel 22 will be described in detail hereinbelow.

The file sharing program 23 is for realizing a file-sharing function (a function that shares a file inside a logical volume with a plurality of clients 1). The file-sharing program 23, for example, can be an NFS (Network Files System) or a CIFS (Common Internet File System).

The file system 24 is a program for carrying out the management and so forth of a file stored in the logical volume 27. The file system 24 uses an i-node table 242 to manage a file stored in the logical volume 27. Specifically, the file system 24 manages respective management-targeted files (the directory pathnames of the files) by making these files correspondent to a single element called an i-node. Then, information related to a file corresponding to a pertinent i-node is managed in the i-node table 242 for each i-node. Further, the file system 24 also manages the corresponding relationship between a file directory pathname and an i-node independently of the i-node table 242. The file system 24, for example, comprises a sub-program, such as an access characteristics information creation module 241. The i-node table 242 and the processing carried out by the access characteristics information creation module 241 will be explained in detail hereinbelow.

The LU management program 25 is a program for managing a LU 421 capable of being allocated to the logical volume 27. The LU management program 25, for example, comprises a subprogram, such as a LU registration processor 251. Further, the LU management program 25, for example, also comprises various tables, such as an LU management table 252. The processing carried out by the LU registration processor 251 and the LU management table 252 will be explained in detail hereinbelow.

In addition to the various programs 22, 23, 24, 25, the NAS 2 also comprises one or more logical volumes 27. The logical volume 27 is a virtual volume, and is allocated with one or more LU provided by the storage system 4. The logical volume 27 is provided to the client 1 from the NAS 2.

The respective storage systems 4 comprise one or more LU 421. The LU 421 is provided to the NAS 2 from the storage system 4. A logical storage device is allocated to the LU 421. A logical storage device can be a virtual logical storage device, or a substantial logical storage device. The substantial logical storage device is either all or a part of the storage space of a plurality of physical storage devices 413. What is called a virtual logical storage device in this embodiment is a type of storage device in which data is stored using a storage mode via which real capacity is dynamically expanded. Specifically, when a write takes place to a virtual area for which a real area has not been allocated of a plurality of virtual areas configuring a virtual logical storage device, the DKC 412 selects an unallocated real area from among a plurality of real areas that configure one or more substantial logical storage devices that have not been allocated to the LU 421, allocates this real area to the virtual area to which the write occurred, and writes the write-targeted data to this allocated real area. For the sake of convenience, hereinafter this storage mode will be called the "AOU mode" (AOU is the abbreviation for Allocate On Use).

Figure 3:
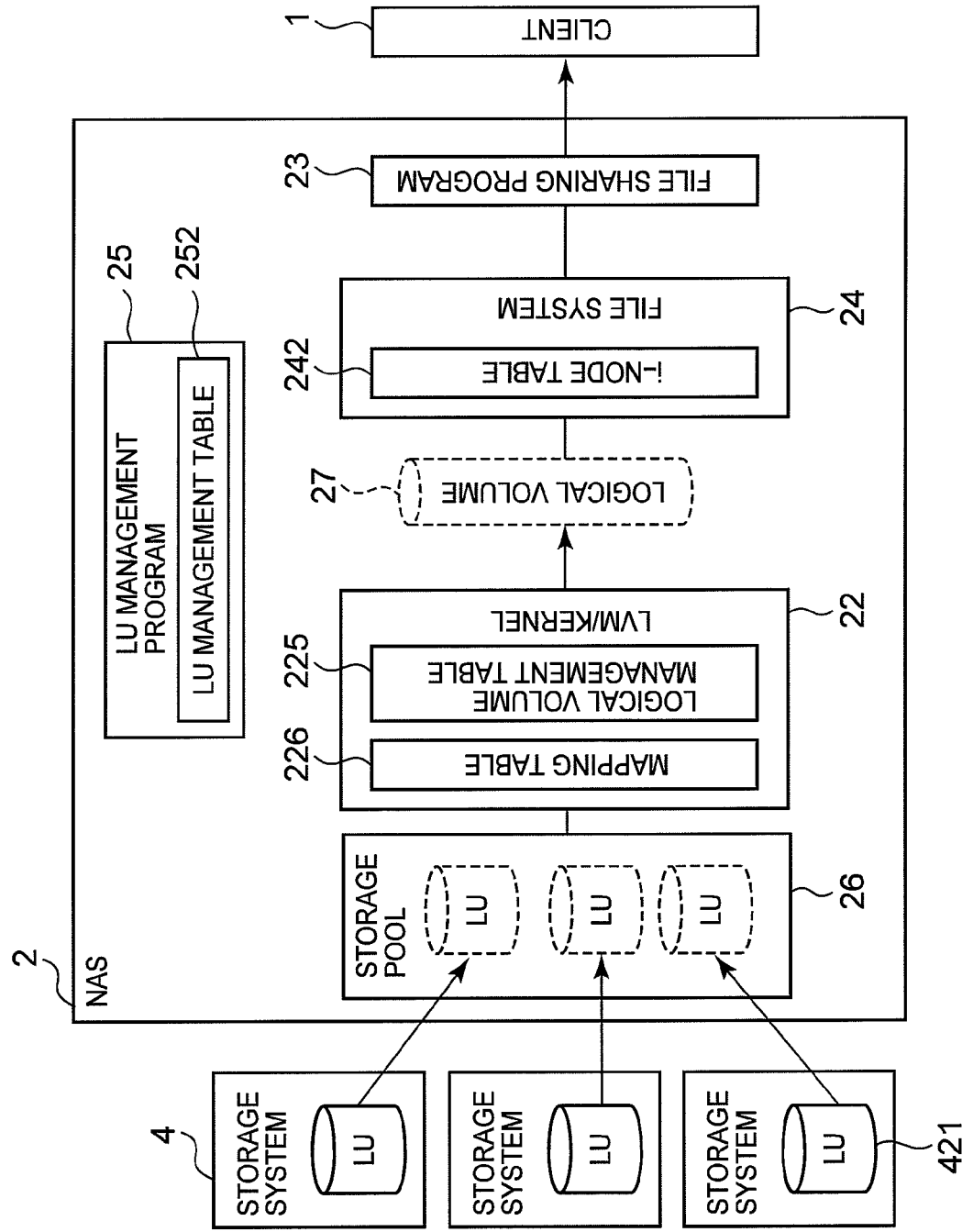
FIG. 3 is a diagram illustrating the relationship among an LU, logical volume and file system.

FIG. 3 is a diagram illustrating the relationship between the LU 421, logical volume 27 and file system 24.

As described hereinabove, the logical volume 27, which is provided to the client 1 by the NAS 2, is allocated with one or more LU 421 provided by the storage system 4.

The NAS 2 manages the LU 421, which are respectively provided by the respective storage systems 4 (the LU 421 that the NAS 2 is able to utilize from among the LU 421 that the respective storage system 4 respectively comprise) in a storage pool 26. Specifically, the LU management program 25 of the NAS 2 manages the usable LU 421 by registering these usable LU 421 in the LU management table 252. The LVM/Kernel 22 of the NAS 2 reserves a storage area of the logical volume 27 by allocating a storage area of one or more LU 421 managed in the storage pool 26 as the storage area of the logical volume 27.

The client 1 uses functions provided by the file system 24 and file-sharing program 23 to access the logical volume 27. The client 1, for example, can read out a file from the logical volume 27 or write a file to the logical volume 27 by referencing a tree view of a directory displayed by the file system 24 and file-sharing program 23.

Figure 4:
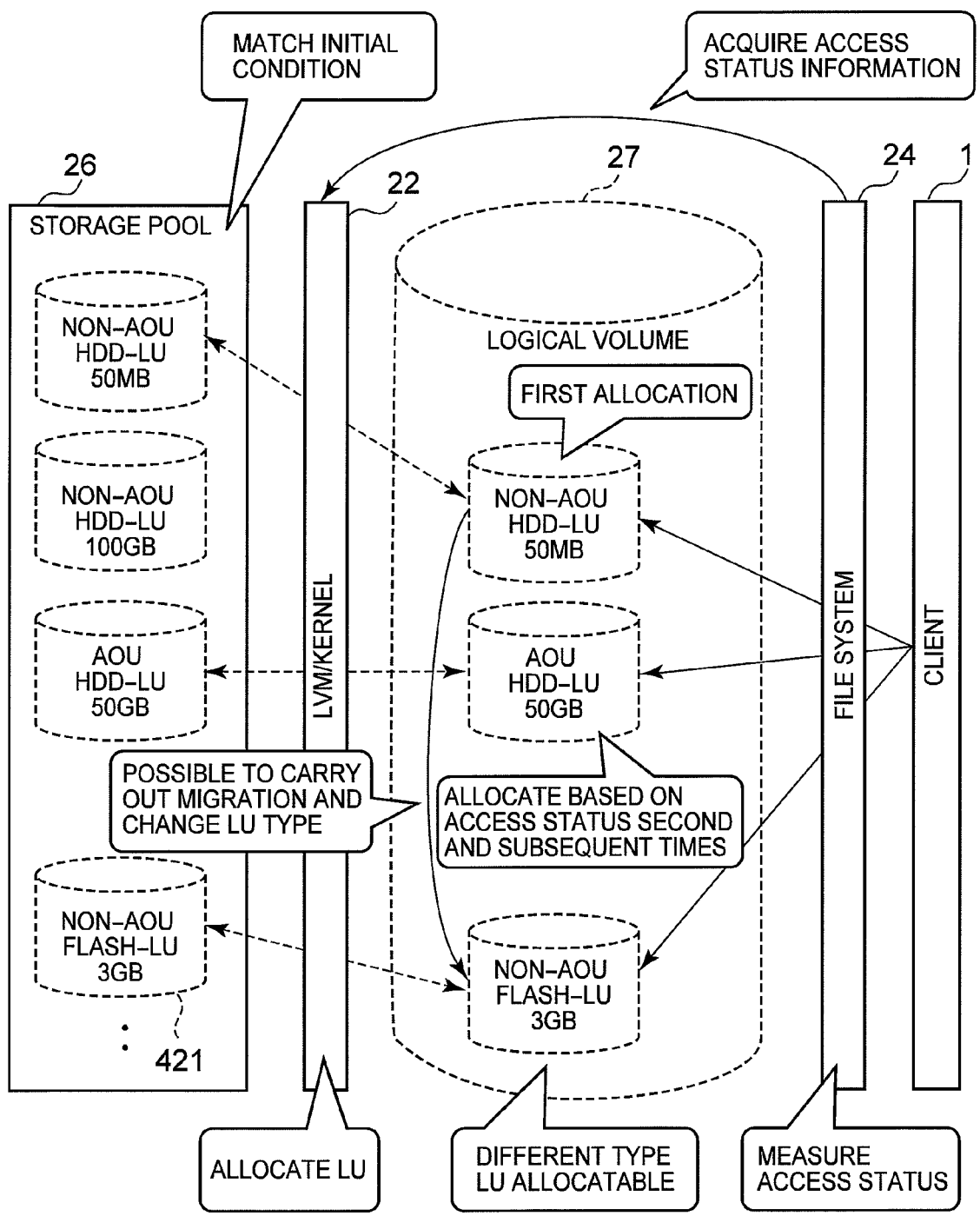
FIG. 4 is a diagram illustrating the characteristic features of a NAS related to this embodiment.

FIG. 4 is a diagram illustrating the characteristic features of a NAS 2 related to this embodiment.

In this embodiment, a plurality of types of LU 421 is managed in the storage pool 26. Various types of LU 421 will be considered here in accordance with the type of physical storage device 413 that is allocated, and the different storage modes. As examples of the types of LU 421, for example, there is the LU 421 that is formed by the allocation of a HDD storage area (hereinafter, "HDD-LU"), and the LU 421 that is formed by the allocation of a flash memory drive (hereinafter, "flash-LU"). Also, for example, there is an LU 421 of the AOU storage mode, and an LU 421 of an ordinary storage mode other than the AOU mode (non-AOU mode). In this embodiment, four types of LU 421 will be considered: a HDD-LU of the AOU mode; a flash-LU of the AOU mode; a HDD-LU of a non-AOU mode; and a flash-LU of a non-AOU mode.

The different types of LU 421 have different characteristic features. For example, a flash-LU has a shorter seek time than a HDD-LU, thereby offering better access performance in the case of random accessing, and also has low power consumption. On the flip side of the coin, the flash-LU has a lower write-cycle limit than the HDD-LU. Therefore, for example, it is preferable that a flash-LU be allocated as the storage area of a logical volume 27 when read accesses outnumber write accesses. By contrast, it is preferable that a HDD-LU be allocated as the storage area of a logical volume 27 when write accesses outnumber read accesses. Further, it is preferable that a flash-LU be allocated as the storage area of a logical volume 27 when the NAS 2 is an always-on server in order to enhance the power-saving effect.

Further, compared to the non-AOU mode, the AOU mode possesses characteristics that enable a storage area to be used efficiently. This is because, in the AOU mode, a storage area equivalent to the size of the LU 421 is not reserved beforehand, but rather, every time a LU 421 storage area becomes necessary as a result of a write, an LU 421 storage area of the required size is reserved. Conversely, in the AOU mode, because processing is carried out for reserving the storage area when the reserving of a storage area is necessary as the result of a write, the processing load for a write process is greater than for the non-AOU mode. Therefore, for example, when the rate of writes (the writing in of new data) requiring the reserving of storage areas is high (in other words, when the rate at which the quantity of data stored in the logical volume 27 increases is high), it is preferable that a non-AOU-mode LU 421 be allocated as the storage area of the logical volume 27. By contrast, when the data quantity increase rate is not all that high, it is preferable that an AOU-mode LU 421 be allocated as the storage area of the logical volume 27. This is because using a non-ASUO-mode LU 421 despite the fact that the data quantity increase rate is not all that high gives rise to numerous areas that have been reserved as LU 421 storage areas but are not actually used (unused areas), resulting in the wasteful consumption of storage resources. Further, using an AOU-mode LU 421 despite the fact that the data quantity increase rate is high, that is, when it is not all that necessary to tackle the problem of an increase in unused areas, increases the write processing load for no reason.

The LVM/Kernel 22 of the NAS 2 related to this embodiment decides the type of LU 421 (can also include the size of the LU 421) to be allocated to a logical volume 27 based on the access characteristics of this logical volume 27 (hereinafter "access characteristics"). Access characteristics in this embodiment, for example, comprise the ratio of read accesses to write accesses (hereinafter, "read/write ratio"), the type of file being written in, and the data quantity increase rate. Of the access characteristics for the logical volume 27, the read/write ratio (the number of read accesses and write accesses for achieving a read/write ratio) and the type of file being written are measured by the NAS 2 file system 24. Conversely, the data quantity increase rate is measured by the LVM/Kernel 22 of the NAS 2.

The LVM/Kernel 22 does not allocate a LU 421 when a new logical volume 27 is created, but rather carries out the allocation of a LU 421 when the need arises to reserve a storage area of the logical volume 27 as the result of a write to the logical volume 27. As described hereinabove, the type of LU 421 to be allocated is decided based on the access characteristics of the logical volume 27 that has become the target of this allocation. Therefore, the LVM/Kernel 22 must know the access characteristics for the target logical volume 27 at the point in time at which LU 421 allocation is carried out. For this reason, the LVM/Kernel 22 allocates a LU 421 that corresponds to a pre-defined initial condition at the time of an initial write. The initial condition, for example, can comprise the size of the LU 421 to be allocated (initial size), and the type of the LU 421 to be allocated (initial type). The initial size, for example, is the smallest size required for measuring the access characteristics. FIG. 4 shows an example of a case in which the initial size is 50 MB, and the initial type in non-AOU-mode HDD-LU. When the need arises to reserve a storage area for the second and subsequent write, the LVM/Kernel 22 decides the type of LU 421 to be allocated by referencing information that shows the access characteristics (hereinafter, "access characteristics information"), which has been measured by the LVM/Kernel 22 and the file system 24.

As shown in this figure, the LVM/Kernel 22 can allocate a different type LU 421 for one logical volume 27. Further, the LVM/Kernel 22, for example, can also change the LU 421 type by carrying out a migration when there is a change in the access characteristics subsequent to LU 421 allocation.

FIG. 5 is a diagram showing an example of a LU management table 252.

The LU management table 252 is for managing information related to LU 421 capable of being allocated to the logical volume 27 (that is, LU 421 that have been pooled in the storage pool 26). In the LU management table 252, for example, there is recorded for each LU 421 LU identification information 511, storage type 512, storage mode type 513, size 514, status 515, and creation date 516. The respective information 511 through 516 will be explained hereinbelow using a single LU 421 (hereinafter, referred to as the "target LU" in the explanation of FIG. 5) as an example.

The LU identification information 511 is for uniquely specifying the target LU. The storage type 512 is information showing the type of physical storage device 413 on which the target LU has been formed. For example, when the target LU is a HDD-LU, the storage type 512 is "DISK". Further, when the target LU is a flash-LU, the storage type 512 is "FLASH". The storage mode type 513 is information showing the storage mode of the target LU. For example, when the target LU storage mode is the AOU mode, the storage mode type 513 is "AOU". Further, when the target LU storage mode is the non-AOU mode, the storage mode type 513 is "NON-AOU". The size 514 is the size of the target LU. The status 515 is information showing whether or not the target LU has been allocated to the logical volume 27. For example, when the target LU has already been allocated to a certain logical volume 27, the status 515 is "allocated". Conversely, when the target LU has still not been allocated to the logical volume 27, the status 515 is "unallocated". The creation date 516 is the date on which the target LU was created.

FIG. 6 is a diagram showing an example of a mapping table 226.

The mapping table 226 is for managing the corresponding relationship between a logical volume 27 and the LU 421 allocated to this logical volume 27. A mapping table 226, for example, is created for each logical volume 27. Arbitrary names are assigned to the respective mapping tables 226. In the mapping table 226, for example, there is stored for each allocated LU 421 logical volume 27 start/end addresses 521, LU identification information 522, and LU start/end addresses 523. The respective information 521 through 523 will be explained hereinbelow using a single LU 522 (hereinafter, referred to as the "target LU" in the explanation of FIG. 6) as an example.

The logical volume start/end addresses 521 are information showing the location of the storage area in the logical volume 27 to which the target LU storage area, which is shown by the LU start/end addresses 523, is allocated. The LU identification information 522 is for uniquely identifying the target LU. The LU start/end addresses 523 are information showing the storage area location of the target LU allocated to the storage area of the logical volume 27, which is shown by the logical volume start/end addresses 521.

FIG. 7 is a diagram showing an example of a logical volume management table 225.

The logical volume management table 225 is for managing information related to the logical volume 27 created in the NAS 2. In the logical volume management table 225, for example, there is stored logical volume identification information 531, maximum size 532, and a mapping table name 533 for each logical volume 27. The respective information 531 through 533 will be explained hereinbelow using a single logical volume 27 (hereinafter, referred to as the "target logical volume" in the explanation of FIG. 7) as an example.

The logical volume identification information 531 is for uniquely specifying the target logical volume. The maximum size 532 is the maximum size of the target logical volume. The mapping table name 533 is information showing the name of the mapping table 226 related to the target logical volume.

Figures 8, 9:
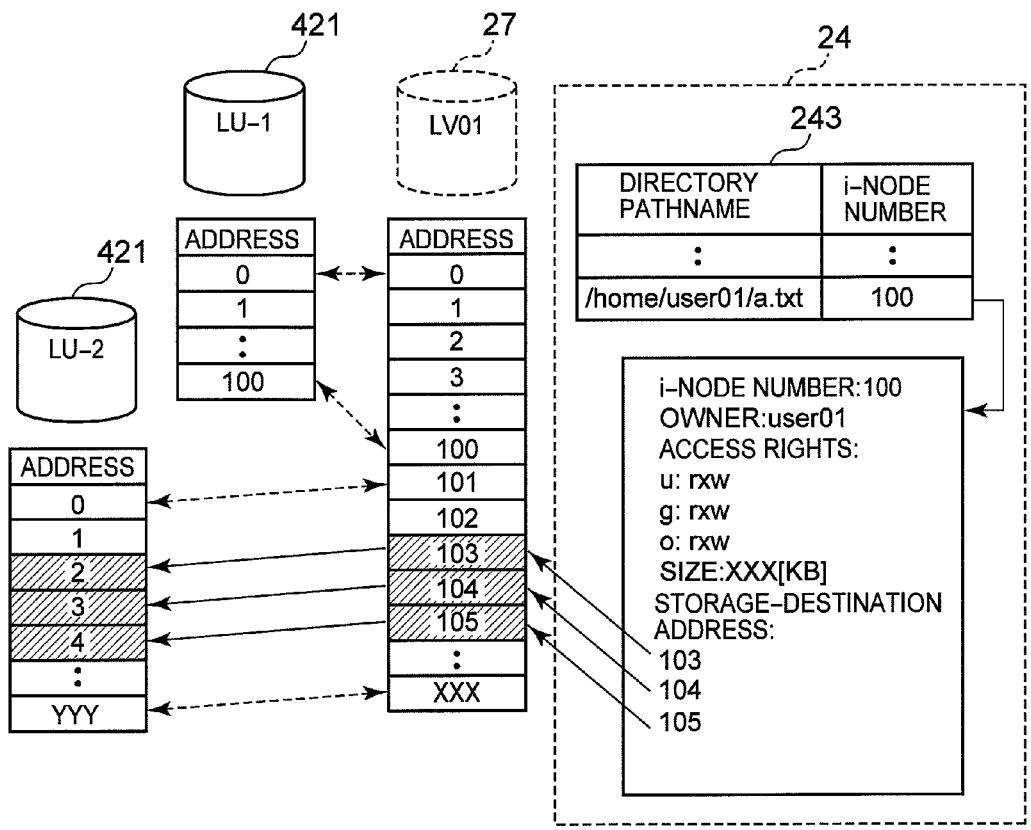
FIG. 8 is a diagram showing an example of an i-node table.
FIG. 9 is a diagram showing a specific example of the allocation of an LU to the logical volume.

FIG. 8 is a diagram showing an example of an i-node table 242.

The i-node table 242 is for managing information related to a file that is managed by the file system 24 (a file stored in the logical volume 27). In the i-node table 242, for example, there is stored an i-node number 541, owner 542, access right 543, size 544, and one or more storage destination addresses 545 for each i-node. The respective information 541 through 545 will be explained hereinbelow using a single i-node (hereinafter, referred to as the "target i-node" in the explanation of FIG. 8) as an example.

The i-node number 541 is the number assigned to the target i-node. The owner 542 is information showing the owner of the file that has been made correspondent to the target i-node. The access right 543 is information showing access rights to the file that has been made correspondent to the target i-node. The size 544 is the size of the file that has been made correspondent to the target i-node. The storage-destination address 545 is information showing the storage destination of data configuring the file that has been made correspondent to the target i-node.

FIG. 9 is a diagram showing a specific example of an allocation of the LU 421 to the logical volume 27.

In the example of this figure, storage area addresses "0" through "100" in LU "LU-1" are allocated as the storage area addresses "0" through "100" in logical volume "LV01". Further, storage area addresses "0" through "YYY" in LU "LU-2" are allocated as the storage area addresses "101" through "XXX" in logical volume "LV01". That is, the two LU "LU-1" and "LU-2" are allocated to logical volume "LV01".

The file system 24, for example, uses table 243 to manage the corresponding relationship between the directory pathname and the i-node number of the file stored in logical volume "LV01". In the example of this figure, a file with the directory pathname "/home/user01/a.txt" (hereinafter, will be referred to as the "target file" in the explanation of FIG. 9) is stored in the logical volume "LV01" as shown in table 243. Then, the i-node number of the i-node that has been made correspondent to the target file is "100". Therefore, the information 244 related to the target file is obtained by referencing the respective information 541 through 545 related to the i-node using the i-node number "100" in the i-node table 242.

As shown in the information 244 related to the target file, the target file storage-destination addresses are "103", "104" and "105". Therefore, the data configuring the target file is stored in the storage areas shown by addresses "103", "104"

and "105" in the logical volume "LV01", that is, in the storage areas shown by the addresses "2", "3" and "4" in LU "LU-2".

FIG. 10 is a diagram showing an example of an access log 61.

The access log 61 is a log of accesses to the logical volume 27 from the client 1. The access log 61 is acquired by the file system 24. The access log 61 is used to create read/write comparison information (to be explained hereinbelow), which is one kind of access characteristics information. The access log 61, for example, comprises the date/time 611 the file was accessed, the file pathname 612 of the accessed file, and the access type 613 showing if it was a read access or a write access.

FIG. 11 is a diagram showing an example of read/write comparison information 62.

Read/write comparison information 62 is one kind of access characteristics information, and is information for achieving a read/write ratio based on the number of read accesses and the number of write accesses. The read/write comparison information 62 is created by the access characteristics information creation module 241 of the file system 24. The access characteristics information creation module 241 creates the read-write comparison information 62 by referencing the access log 61 and information related to file management (the i-node table 242 and table 243).

The read/write comparison information 62, for example, comprises the number of read accesses targeting all the files inside the logical volume 27 (hereinafter, "total number of reads") 621, the number of write accesses targeting all the files inside the logical volume 27 (hereinafter, "total number of writes") 622, total I/O capacity of read accesses targeting all the files inside the logical volume 27 (hereinafter "total read I/O capacity") 623, and total I/O capacity of write accesses targeting all the files inside the logical volume 27 (hereinafter "total write I/O capacity") 624. The total read I/O capacity 623, for example, is the total file size of the read-accessed files, and the total write I/O capacity 624, for example, is the total file size of the write-accessed files.

The read/write comparison information 62 further comprises the number of files for each type of file (for each file extension) (hereinafter, "number of individual files") 625, the number of read accesses for each file extension (hereinafter, the "number of individual reads") 626, the number of write accesses for each file extension (hereinafter, the "number of individual writes") 627, the total I/O capacity of the read accesses for each file extension (hereinafter, the "individual read I/O capacity") 628, and the total I/O capacity of the write accesses for each file extension (hereinafter, the "individual write I/O capacity") 629. Similar to the total read I/O capacity 623 and the total write I/O capacity 624, the individual read I/O capacity 628, for example, is the total file size of read-accessed files for files having targeted extensions, and the individual write I/O capacity 629, for example, is the total file size of write-accessed files for files having targeted extensions.

FIG. 12 is a diagram showing an example of a monitor time definition file 71.

The monitor time definition file 71 is a file used when the write request receiving processor 222 of the LVM/Kernel 22 measures the data quantity increase rate (in this embodiment, the average value of the time during which the quantity of data did not change (hereinafter, "invariable time")) of the data stored in the logical volume 27. For example, a plurality of monitor times is defined in the monitor time definition file 71. The write request receiving processor 222 implements the measurement of the data quantity increase rate during a monitor time that is defined in the monitor time definition file 71.

Specifically, as shown in FIG. 13, each time the quantity of data increases as the result of a new data write, for example, the time 712 at which this write was carried out, the number of times the data quantity increased 713, and the invariable time average value 714 are recorded. The invariable time average value 714, for example, is computed using (Equation 1).

Invariable Time Average Value=(Time Period from Time Data Quantity First Increased During Monitor Time Until Most Recent Time Data Quantity Increased)/Number of Times Data Quantity Increased   (Equation 1)

Furthermore, a data quantity increase rate 716 is recorded in addition to the invariable time average value 714. The data quantity increase rate 716, for example, is used to determine the size of the LU 421 allocated to the logical volume 27. The data quantity increase rate 716, for example, is computed using (Equation 2).

Data Quantity Increase Rate=Total Size of Written Data/(Time Period from Time Data Quantity First Increased During Monitor Time Until Most Recent Time Data Quantity Increased)   (Equation 2)

FIG. 14 is a diagram showing an example of data quantity increase rate information 72.

Data quantity increase rate information 72 is one kind of access characteristics information, and is information that shows the data quantity increase rate of data stored in the logical volume 27. In the data quantity increase rate information 72, there is recorded for each logical volume 27, for example, an invariable time average value 714 measured by the write request receiving processor 222, and a data quantity increase rate 716.

The preceding has been an explanation of the configuration of a computer system related to this embodiment. The processing carried out by a NAS 2 related to this embodiment will be explained in detail below.

Figure 15:
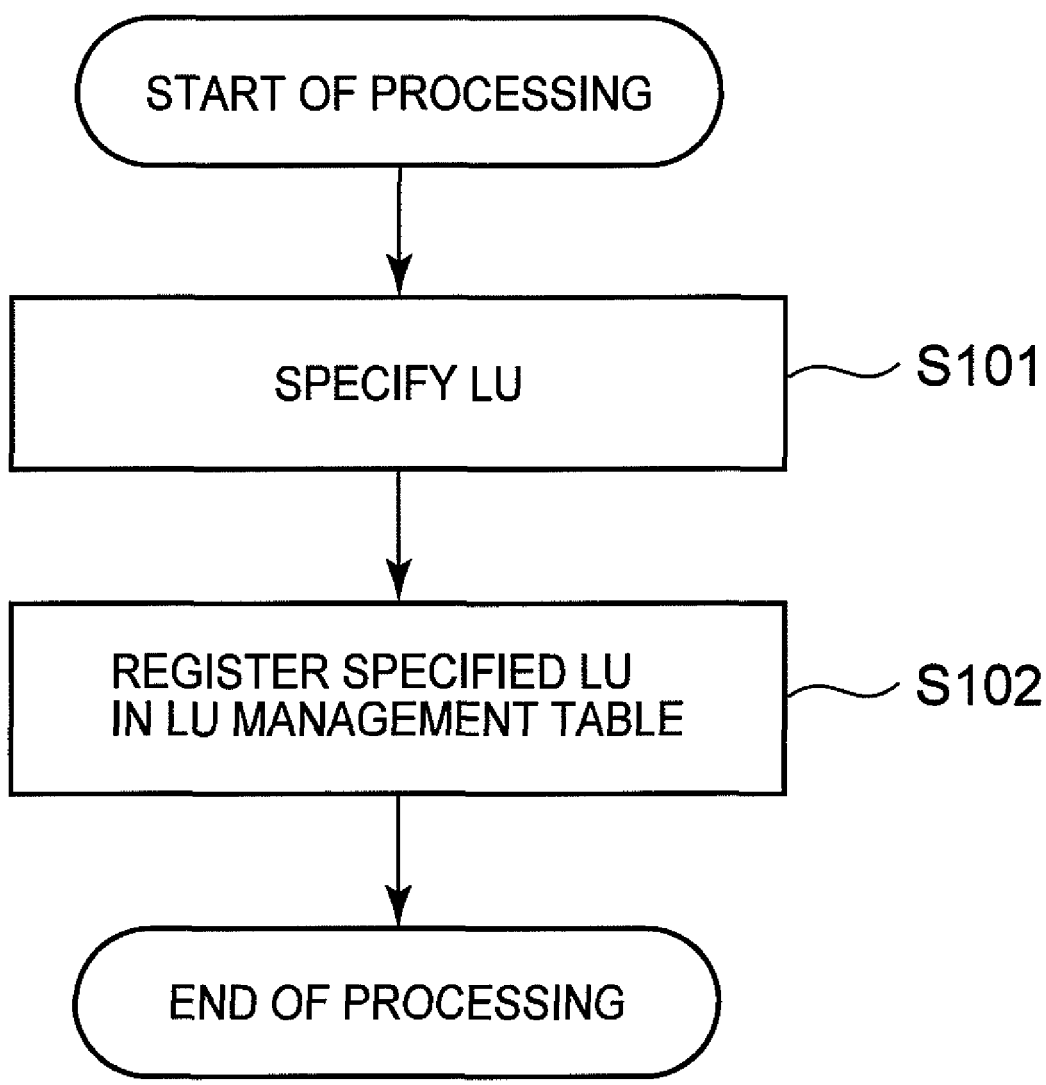
FIG. 15 is a flowchart of the processing carried out by a LU registration processor.

FIG. 15 is a flowchart of the processing carried out by the LU registration processor 251.

First, the administrator specifies a LU 421 to be managed in the storage pool 26 (S101).

Next, the LU registration processor 251 registers the LU 421 specified in S101 in the LU management table 252 (S102).

Figure 16:
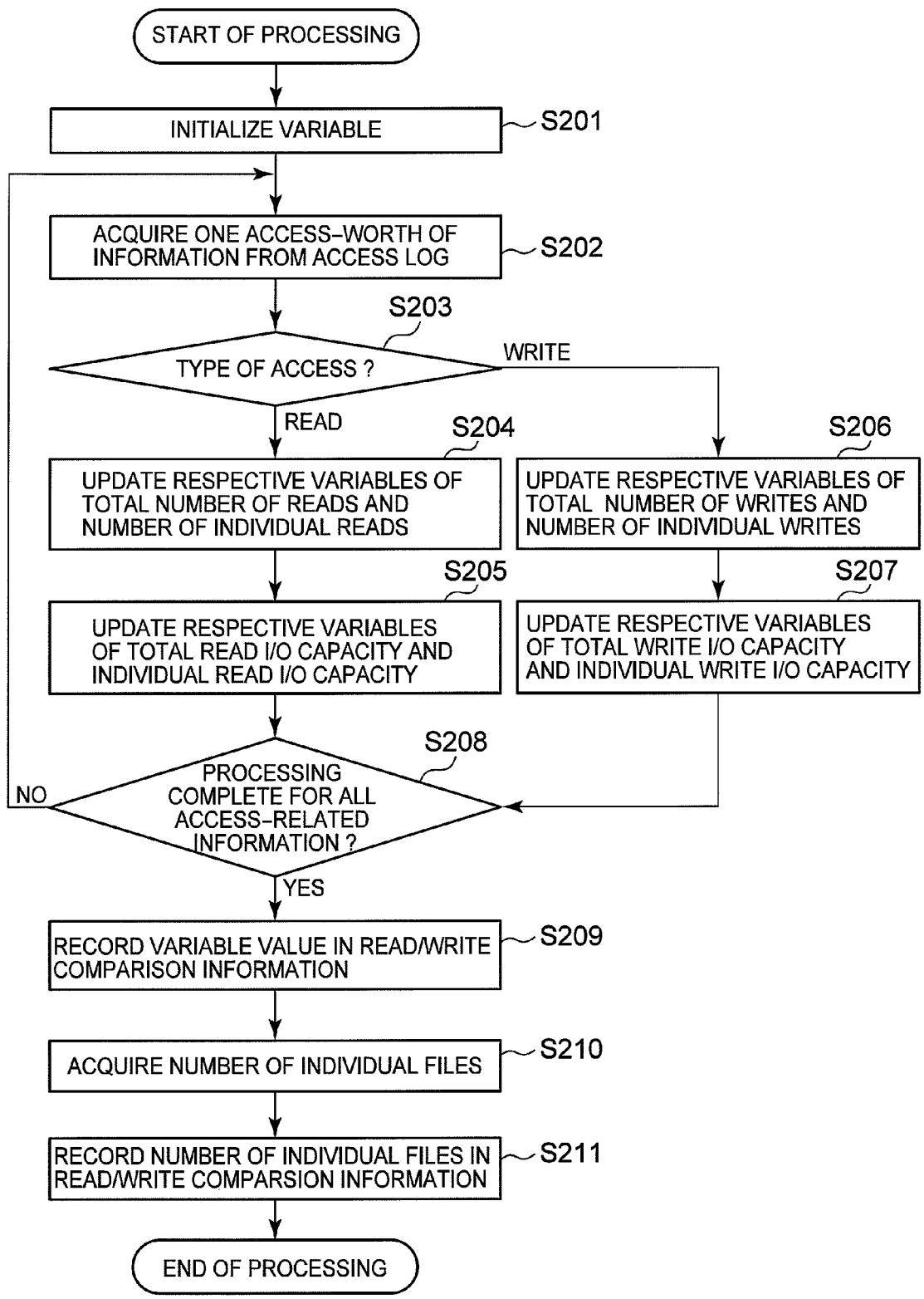
FIG. 16 is a flowchart of the processing carried out by an access characteristics information creation module.

FIG. 16 is a flowchart of the processing carried out by the access characteristics information creation module 241.

First, the access characteristics information creation module 241 initializes a variable into which respective information recorded in the read/write comparison information 62 is stored (S201). Specifically, the access characteristics information creation module 241 configures "0" in the variables in which the total number of reads 621, total number of writes 622, total read I/O capacity 623, total write I/O capacity 624, number of individual reads 626, number of individual writes 627, individual read I/O capacity 628, and individual write I/O capacity 629 are respectively stored. Furthermore, a variable in which information for each file extension (number of individual reads 626, number of individual writes 627, individual read I/O capacity 628, and individual write I/O capacity 629) is stored is prepared for each extension.

Next, the access characteristics information creation module 241 acquires one access worth (one line worth) of information (date/time 611, file pathname 612, and access type 613) from the access log 61 (S202).

Next, the access characteristics information creation module 241 determines if the access type 613 acquired in S202 is a "read" or a "write" (S203).

When the determination result of S203 is "read" (S203: Read), the access characteristics information creation module 241 updates the respective variables of the total number of reads 621 and the number of individual reads 626 (S204). Specifically, the access characteristics information creation module 241 adds 1 to the variable of the total number of reads 621. Further, the access characteristics information creation module 241 adds 1 to the variable of the number of individual reads 626 for the extension of the file (hereinafter, referred to as the "target file" in the explanation of FIG. 16) shown by the file pathname 612 acquired in S202.

Next, the access characteristics information creation module 241 updates the respective variables of the total read I/O capacity 623 and the individual read I/O capacity 628 (S205). Specifically, the access characteristics information creation module 241 adds the size 544 of the i-node that has been made correspondent to the target file in the i-node table 242 to the variable of the total read I/O capacity 623. Further, the access characteristics information creation module 241 adds the size 544 of the i-node that has been made correspondent to the target file in the i-node table 242 to the variable of the individual read I/O capacity 628 for the target file extension.

Conversely, when the determination result of S203 is "write" (S203: Write), the access characteristics information creation module 241 updates the respective variables of the total number of writes 622 and the number of individual writes 627 (S206). Specifically, the access characteristics information creation module 241 adds 1 to the variable of the total number of writes 622. Further, the access characteristics information creation module 241 adds 1 to the variable of the number of individual writes 627 for the target file extension.

Next, the access characteristics information creation module 241 updates the respective variables of the total write I/O capacity 624 and the individual write I/O capacity 629 (S207). Specifically, the access characteristics information creation module 241 adds the size 544 of the i-node that has been made correspondent to the target file in the i-node table 242 to the variable of the total write I/O capacity 624. Further, the access characteristics information creation module 241 adds the size 544 of the i-node that has been made correspondent to the target file in the i-node table 242 to the variable of the individual write I/O capacity 629 for the target file extension.

The access characteristics information creation module 241 repeatedly executes the processing of S202 through S207 for all the information related to the accesses recorded in the access log 61 (S208).

After executing the processing of S202 through S207 for all the information related to the accesses recorded in the access log 61, the access characteristics information creation module 241 records in the read/write comparison information 62 the values stored in the respective variables that were initialized in S201 (total number of reads 621, total number of writes 622, total read I/O capacity 623, total write I/O capacity 624, number of individual reads 626, number of individual writes 627, individual read I/O capacity 628, and individual write I/O capacity 629) (S209).

Thereafter, the access characteristics information creation module 241, for example, references table 243 and acquires the number of files (number of individual files) for each file extension stored in the logical volume 27 (S210).

Thereafter, the access characteristics information creation module 241 records the number of individual files acquired in S210 in the read/write comparison information 62 (S211).

Figure 17:
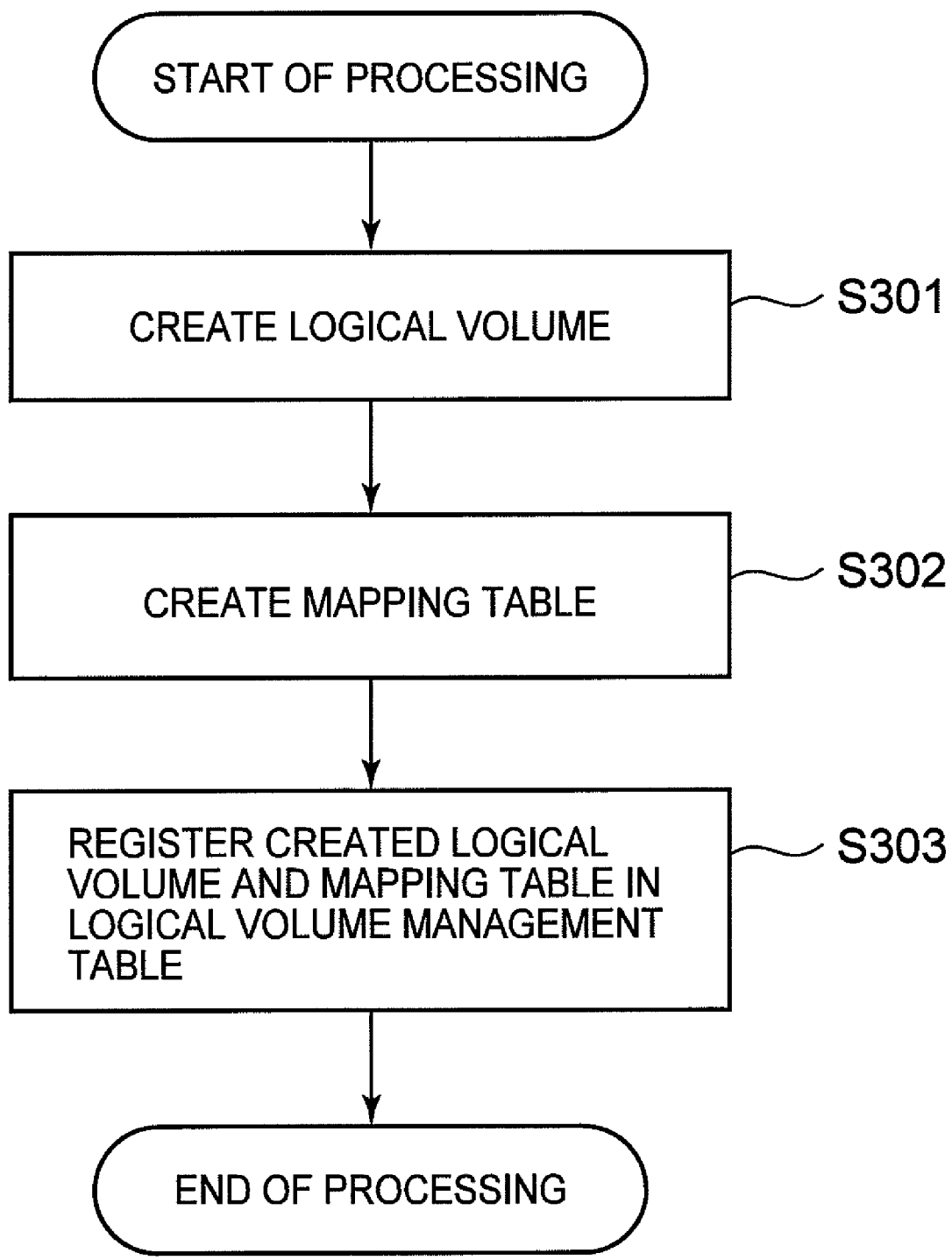
FIG. 17 is a flowchart of the processing carried out by a logical volume creation processor.

FIG. 17 is a flowchart of the processing carried out by the logical volume creation processor 221.

First, the logical volume creation processor 221 creates a logical volume 27 of a specified size (S301). As described hereinabove, a LU 421 has yet to be allocated at the step at which this logical volume 27 is created.

Next, the logical volume creation processor 221 creates a mapping table 226 related to the logical volume 27 created in S301 (S302). Since a LU 421 has not yet been allocated to the logical volume 27 created in S301, in step S302, the respective information 521, 522, 523 of the mapping table 226 created in S302 is null.

Next, the logical volume creation processor 221 associates the identification information 531 and maximum size 532 of the logical volume 27 created in S301 to the name of the mapping table 226 (mapping table name 533) created in S302, and registers same in the logical volume management table 225 (S303).

Figure 18:
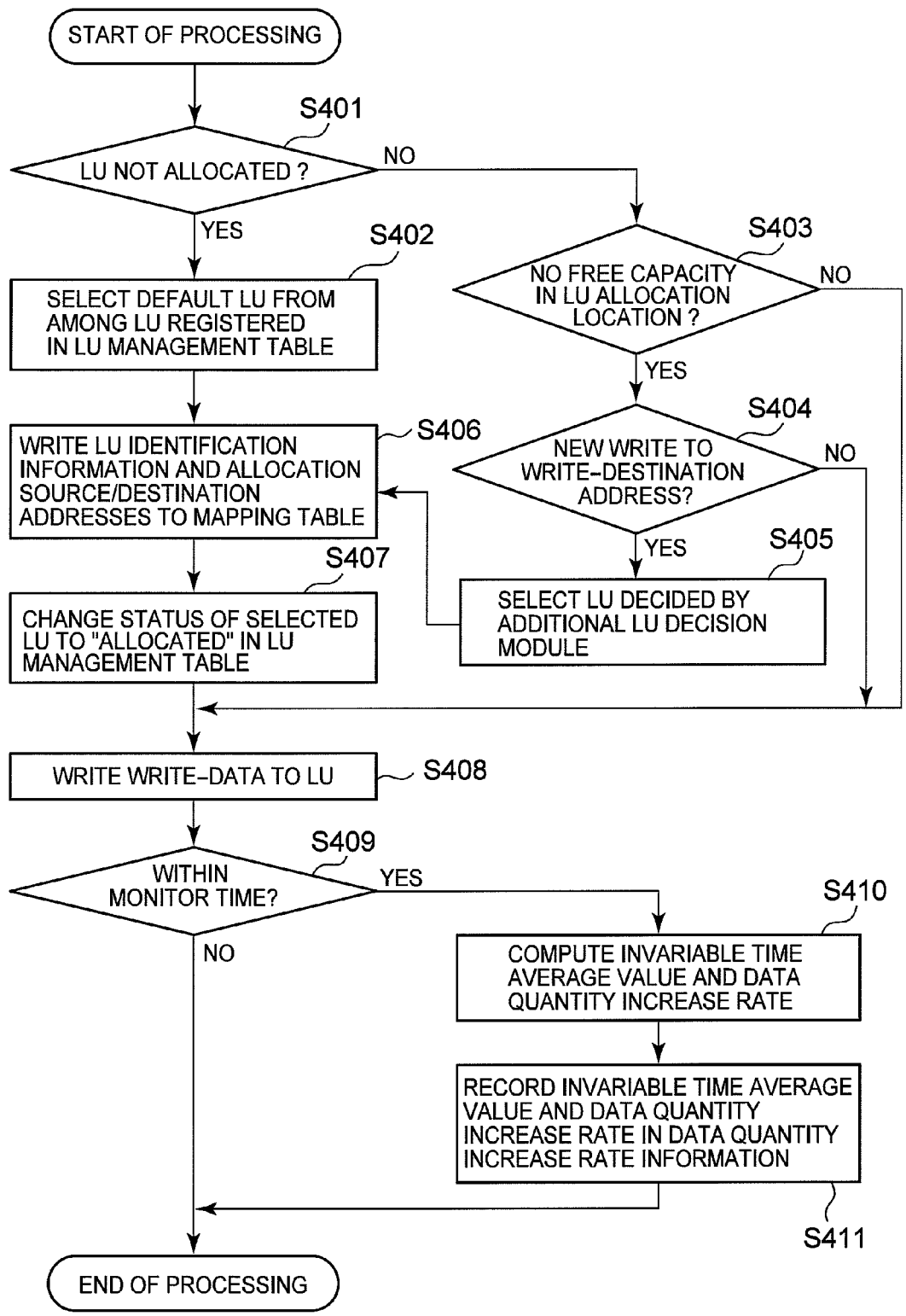
FIG. 18 is a flowchart of the processing carried out by write request receiving processor.

FIG. 18 is a flowchart of the processing carried out by the write request receiving processor 222.

The write request receiving processor 222, which receives a write request, first, determines whether or not a LU 421 has yet to be allocated to the write-targeted logical volume 27 (hereinafter, referred to as the "target logical volume" in the explanation of FIG. 18) (S401).

When a LU 421 has yet to be allocated to the target logical volume (S401: Yes), the write request receiving processor 222 selects a LU 421 that meets the initial condition from among the LU 421 that are registered in the LU management table 252 (S402). Thereafter, the write request receiving processor 222 carries out the processing of S406.

Conversely, when a LU 421 has already been allocated to the target logical volume (S401: No), the write request receiving processor 222 determines there is no free capacity in the LU 421 allocated to the target logical volume (S403).

When there is free capacity in the LU 421 that has been allocated to the target logical volume (S403: No), the write request receiving processor 222 carries out the processing of S408 thereafter.

Conversely, when there is no free capacity in the LU 421 that has been allocated to the target logical volume (S403: Yes), the write request receiving processor 222 determines whether or not the received write request is a new data write (that is, whether or not the data stored in the target logical volume is to be rewritten) (S404).

When the received write request is not a new data write (S404: No), the write request receiving processor 222 carries out the processing of S408 thereafter.

Conversely, when the received write request is a new data write (S404: Yes), the write request receiving processor 222 selects the LU 421 that has been decided by the additional LU decision processor 223 (S405).

In S406, the write request receiving processor 222 associates the identification information 522 of the LU 421 selected in either S402 or S405 (hereinafter, referred to as the "selected LU" in the explanation of FIG. 18) and the selected LU start/end addresses 523 to the location of the target logical volume storage area to which the selected LU is to be allocated (the logical volume start/end addresses 521), and registers this identification information 522 and start/end addresses 523 in the mapping table 226.

Next, the write request receiving processor 222 changes the status 515 of the selected LU in the LU management table 252 to "allocated" (S407). The selected LU is allocated to the target logical volume by the carrying out of the processing of S406 and S407.

Thereafter, the write request receiving processor 222 writes the write-targeted data to the target logical volume (that is, the selected LU) (S408).

Thereafter, the write request receiving processor 222 references the monitor time definition file 71 to determine whether or not the time at which the write request was received fell within the monitor time (S409).

When the time at which the write request was received did not fall within the monitor time (S409: No), the write request receiving processor 222 ends processing.

Conversely, when the time at which the write request was received did fall within the monitor time (S409: Yes), the write request receiving processor 222 acquires the time at which the write occurred 712, the number of times the data quantity has been increased 713, and the size of the written data. Then, on the basis of the acquired information, the write request receiving processor 222 computes the invariable time average value 714 and data quantity increase rate 716 (S410).

Thereafter, the write request receiving processor 222 associates the invariable time average value 714 and data quantity increase rate 716 computed in S410 to the target logical volume, and records this average value 714 and increase ratio 716 in the data quantity increase rate information 72 (S411).

Figure 19:
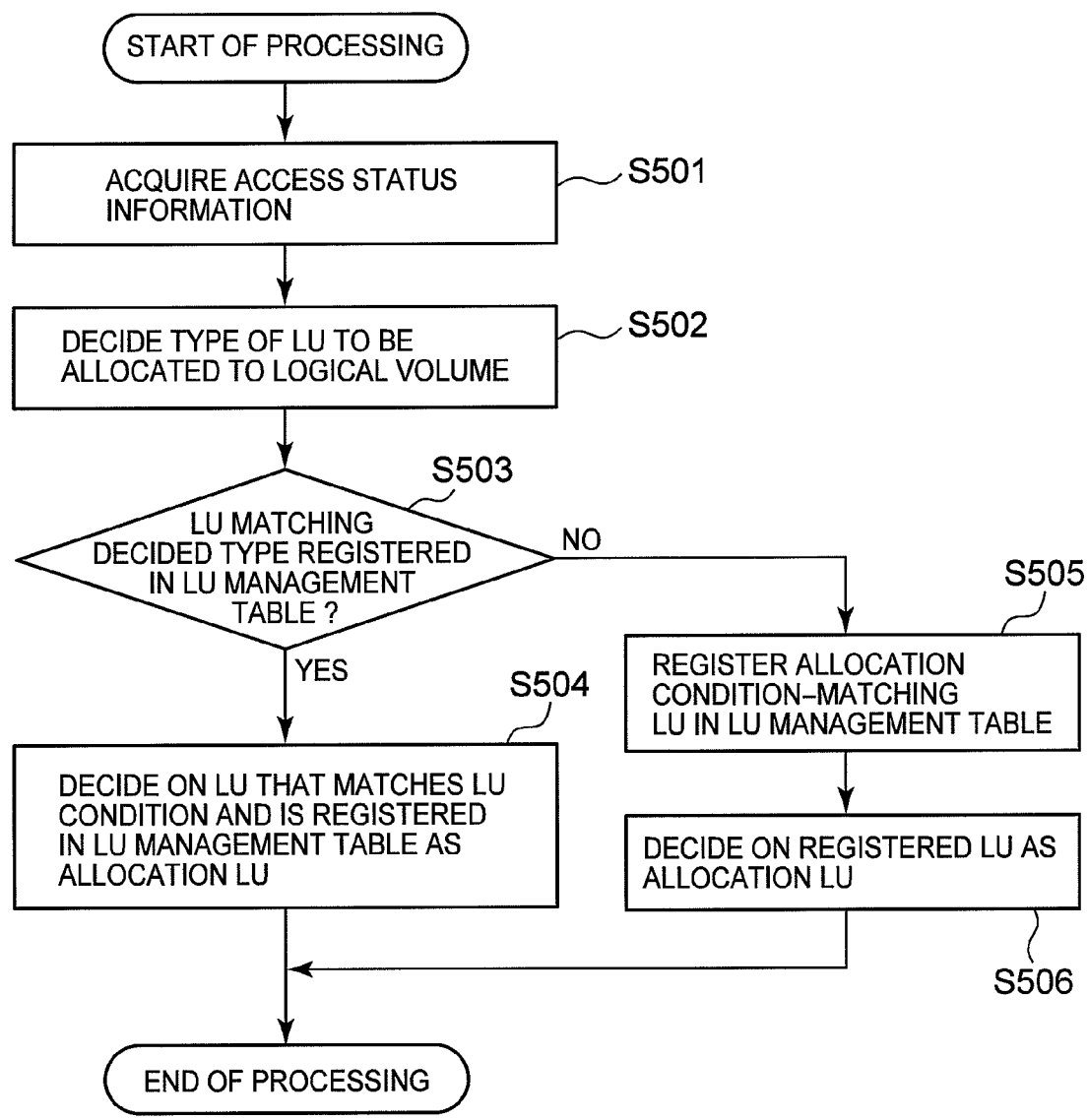
FIG. 19 is a flowchart of the processing carried out by an additional LU decision processor.

FIG. 19 is a flowchart of the processing carried out by the additional LU decision processor 223.

First, the additional LU decision processor 223 acquires access characteristics information related to the logical volume 27 that is being targeted (S501). That is, the additional LU decision processor 223 acquires the read/write comparison information 62 from the file system 24, and acquires the data quantity increase rate information 72 from the write request receiving processor 222.

Next, the additional LU decision processor 223 decides the type (can include the size of the target LU) of the LU 421 (hereinafter, referred to as the "allocation LU" in the explanation of FIG. 19) to be allocated to the logical volume 27 based on the access characteristics information acquired in S501 (S502).

Specific examples of methods for deciding the type of the LU 421 to be allocated to the logical volume 27 based on access characteristics information will be explained here.

(A) A method for deciding if the LU 421 is a HDD-LU or a flash-LU (or the percentages of the size of the HDD-LU and the size of the flash-LU) based on the read/write comparison information 62 shown in FIG. 11.

(A-1) When deciding based on the total number of reads 621 and the total number of write 622, in the example of FIG. 11, the total number of reads 621 is "2000", and the total number of writes 622 is "800". Therefore, the additional LU decision processor 223 can decide on a flash-LU as the allocation LU due to the fact that read access is carried out more often than write access.

Further, the read/write ratio (total number of reads 621/total number of write 622) based on the total number of reads 621 and the total number of writes 622 is 2000/800=2.5. Therefore, for example, the additional LU decision processor 223 can decide on the flash-LU as the allocation LU when the above read/write ratio (2.5) is greater than a prescribed threshold. By contrast, the additional LU decision processor 223 can decide on an HDD-LU as the allocation LU when the above read/write ratio (2.5) is smaller than the prescribed threshold.

Further, the additional LU decision processor 223 can decide on a flash-LU and a HDD-LU as the allocation LU when the ratio of the size of the flash-LU and the size of the HDD-LU coincides with (or approximates) the above read/write ratio (2.5). Furthermore, the additional LU decision processor 223 can increase the percentage of the flash-LU size if the percentage of read accesses in the read/write ratio is larger, and can increase the percentage of the HDD-LU size if the write accesses are larger. For example, the additional LU decision processor 223 can make the ratio of the flash-LU size and HDD-LU size match the above read/write ratio (2.5) by deciding on a 2 GB flash-LU and a 800 MB HDD-LU as the allocation LU.

(A-2) When deciding on the basis of the total read I/O capacity 623 and the total write I/O capacity 624, the process is basically the same as (A-1). That is, in the example of FIG. 11, the total read I/O capacity 623 is "12300 MB", and the total write I/O capacity 624 is "5131 MB". Therefore, the additional LU decision processor 223 can decide on the flash-LU as the allocation LU for the reason that the total read I/O capacity 623 is larger than the total write I/O capacity 624.

Further, the read/write ratio (total read I/O capacity 623/total write I/O capacity 624) based on the total read I/O capacity 623 and the total write I/O capacity 624 is 12300 MB/5131 MB=2.4. Therefore, for example, the additional LU decision processor 223 can decide on the flash-LU as the allocation LU when the above read/write ratio (2.4) is greater than a prescribed threshold. By contrast, the additional LU decision processor 223 can decide on the HDD-LU as the allocation LU when the above read/write ratio (2.4) is smaller than the prescribed threshold.

Further, the additional LU decision processor 223 can decide on a flash-LU and a HDD-LU as the allocation LU when the ratio of the size of the flash-LU and the size of the HDD-LU coincides with (or approximates) the above read/write ratio (2.4).

(A-3) When deciding based on the number of individual files 625, the additional LU decision processor 223 compares the total number of files for which primarily read accesses are carried out (hereinafter, "primary read file") against the total number of files for which write accesses are primarily carried out (hereinafter, "primary write file"), and can decide on a flash-LU as the allocation LU when the total number of primary read files is greater than the total number of primary write files.

Further, the additional LU decision processor 223 can decide on a flash-LU and a HDD-LU as the allocation LU when the ratio of the size of the flash-LU and the size of the HDD-LU coincides with (or approximates) a read/write ratio based on the number of individual files 625 (ratio of the total number of primary read files and the total number of primary write files).

The additional LU decision processor 223, for example, can determine the total number of primary read files and the total number of primary write files as described below. That is, the additional LU decision processor 223, for example, decides if the file possessing a pertinent extension is a primary read file or a primary write file for each extension based on the number of individual reads 626 and number of individual writes 627 or the individual read I/O capacity 628 and the individual write I/O capacity 629. In the example of FIG. 11, for the extension "html", the number of individual reads 626 is "500", and the number of individual writes 627 is "10". Therefore, the additional LU decision processor 223 can decide on a file having the extension "html" as the primary read file for the reason that read accesses are carried out more often than write accesses for files with the "html" extension. Conversely, the additional LU decision processor 223 can decide on a file having the extension "html" as the primary write file when the number of individual writes 627 is greater than the number of individual reads 626. Further, in the example of FIG. 11, the individual read I/O capacity 628 for the extension "html" is "150 MB", and the individual write I/O capacity 629 for the extension "html" is "10 MB". Therefore, the additional LU decision processor 223 can decide on a file having the "html" extension as the primary read file for the reason that individual read I/O capacity 628 is greater than individual write I/O capacity 629 for files with the "html" extension. Conversely, the additional LU decision processor 223 can decide on a file having the "html" extension as the primary write file when the individual write I/O capacity 629 is greater than the individual read I/O capacity 628. Furthermore, the decision as to whether a file is a primary read file or a primary write file can also be made by taking into account the characteristics of the file having the pertinent extension (for example, "html" files are mostly read accessed) without using the number of individual reads 626 and number of individual writes 627, or the individual read I/O capacity 628 and individual write I/O capacity 629.

The total number of primary read files is determined by totaling the number of individual files 625 respectively related to all primary read file extensions. Similarly, the total number of primary write files is determined by totaling the number of individual files 625 respectively related to all primary write file extensions.

(B) A method for deciding on an AOU mode or a non-AOU mode based on the data quantity increase rate information 72 shown in FIG. 14 (in the case of logical volume "LV01").

In the example of FIG. 14, the average value 714 of the invariable time related to logical volume "LV01" is "120[s]". Therefore, for example, if the above invariable time average value 714 (120) is greater than a prescribed threshold, the additional LU decision processor 223 can decide that the AOU mode is the storage mode for the allocation LU for the reason that data quantity increase rate is not that high. By contrast, if the above invariable time average value 714 (120) is less than the prescribed threshold, the additional LU decision processor 223 can decide that the non-AOU mode is the storage mode for the allocation LU for the reason that the data quantity increase rate is high.

(C) A method for deciding the size of an allocation LU based on the data quantity increase rate information 72 shown in FIG. 14 (in the case of logical volume "LV01").

In the example of FIG. 14, the data quantity increase rate 716 related to logical volume "LV01" is "0.34". The additional LU decision processor 223 can decide the size of the allocation LU as being the value obtained by multiplying a prescribed time period (for example, the time period during which an administrator-desired LU 421 is added) by the data quantity increase rate 716.

Return to the explanation of FIG. 19. In S503, the additional LU decision processor 223 determines whether or not an LU 421 that matches the type decided in S502 (hereinafter, referred to as the "allocation condition" in the explanation of FIG. 19) is registered in the LU management table 252.

When an LU 421 that meets the allocation condition is registered in the LU management table 252 (S503: Yes), the additional LU decision processor 223 decides on the LU 421, which meets the allocation condition, and which, in addition, is registered in the LU management table 252 as the allocation LU (S504).

When the LU 421 that meets the allocation condition is not registered in the LU management table 252 (S503: No), the additional LU decision processor 223 registers the LU 421 that meets the allocation condition in the LU management table 252 (S505). Furthermore, the additional LU decision processor 223 can also notify the administrator to the effect that the LU 421 that meets the allocation condition is not registered in the LU management table 252. Then, the additional LU decision processor 223 can register the LU 421 that meets the allocation condition in the LU management table 252 upon receiving an indication from the administrator.

Thereafter, the additional LU decision processor 223 decides on the LU 421 that was registered in the LU management table 252 in S505 as the allocation LU (S506).

Figure 20:
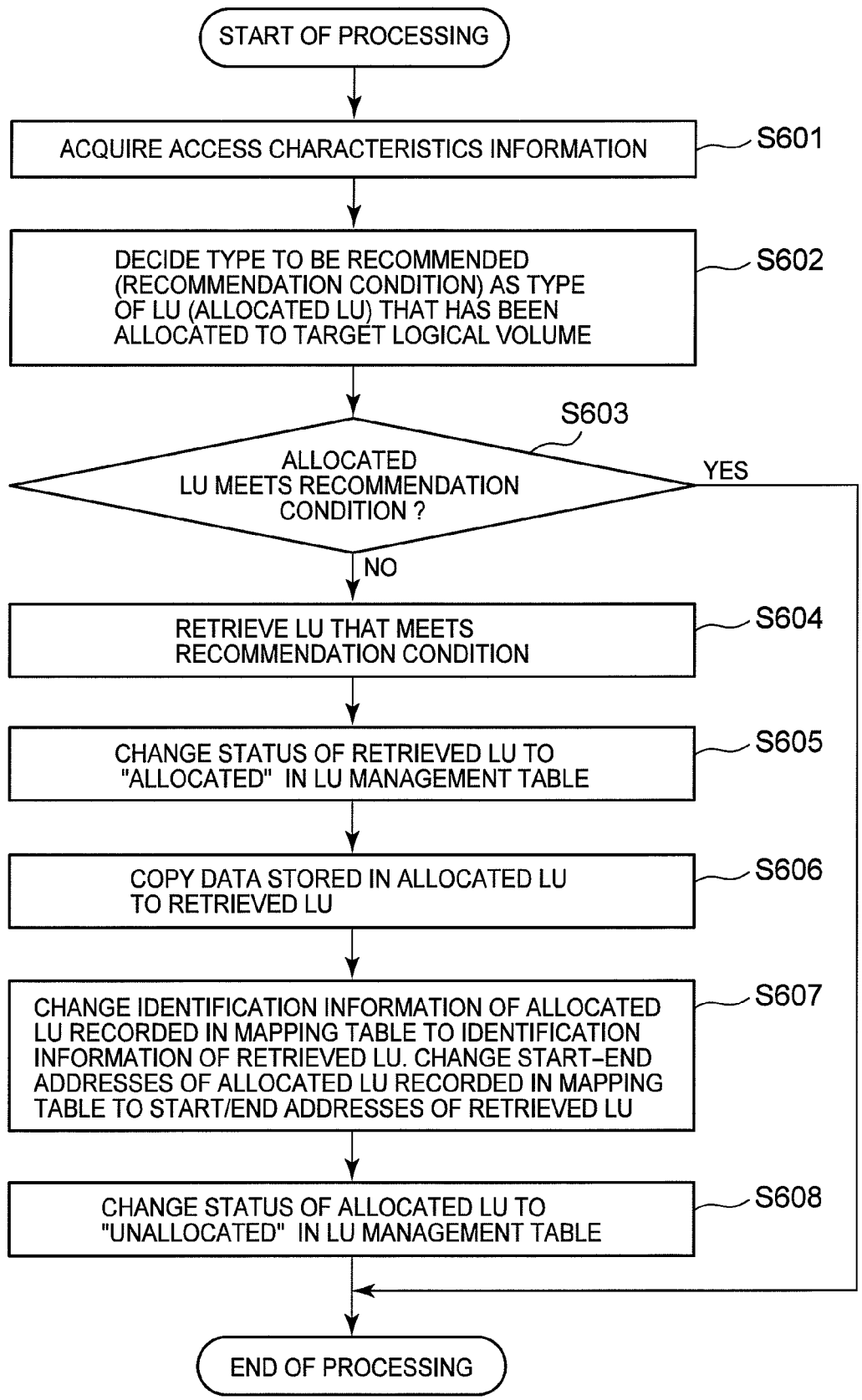
FIG. 20 is a flowchart of a first process carried out by a migration processor.

FIG. 20 is a flowchart of a first process carried out by the migration processor 224.

This processing is executed either regularly or irregularly for each logical volume 27. The logical volume 27 that is the target of this processing will be referred to as the "target logical volume" in the explanation of FIG. 20 hereinbelow.

First, the migration processor 224 acquires access characteristics information related to the target logical volume (S601). That is, the migration processor 224 acquires read/write comparison information 62 from the file system 24, and acquires data quantity increase rate information 72 from the write request receiving processor 222.

Next, based on the access characteristics information acquired in S601, the migration processor 224 decides the type to be recommended as the type of LU 421 allocated to the target logical volume (hereinafter, the "recommendation condition" in the explanation of FIG. 20) (S602). The migration processor 224 can decide on a recommendation condition that is the same as the allocation LU type decided by the additional LU decision processor 223 in FIG. 19.

Thereafter, the migration processor 224 determines whether or not the LU 421 allocated to the target logical volume (hereinafter, referred to as the "allocated LU" in the explanation of FIG. 20) meets the recommendation condition decided in S602 (S603).

When the allocated LU meets the recommendation condition decided in S602 (S603: Yes), the migration processor 224 ends processing.

Conversely, when the allocated LU does not meet the recommendation condition decided in S602 (S603: No), the migration processor 224 retrieves an LU 421 that meets the recommendation condition decided in S602 from among the LU 421 registered in the LU management table 252 (S604).

Thereafter, the migration processor 224 changes the status 515 of the LU 421 retrieved in S604 to "allocated" in the LU management table 252 (S605).

Next, the migration processor 224 copies the data stored in the allocated LU to the LU 421 retrieved in S604 (S606).

Next, the migration processor 224 changes the identification information of the allocated LU recorded in the mapping table 226 to the identification information of the LU 421 retrieved in S604. Further, the migration processor 224 changes the start/end addresses 523 of the allocated LU recorded in the mapping table 226 to the start/end addresses 523 of the LU 421 retrieved in S604 (S607).

Thereafter, the migration processor 224 changes the status 515 of the allocated LU to "unallocated" in the LU management table 252 (S608).

Figure 21:
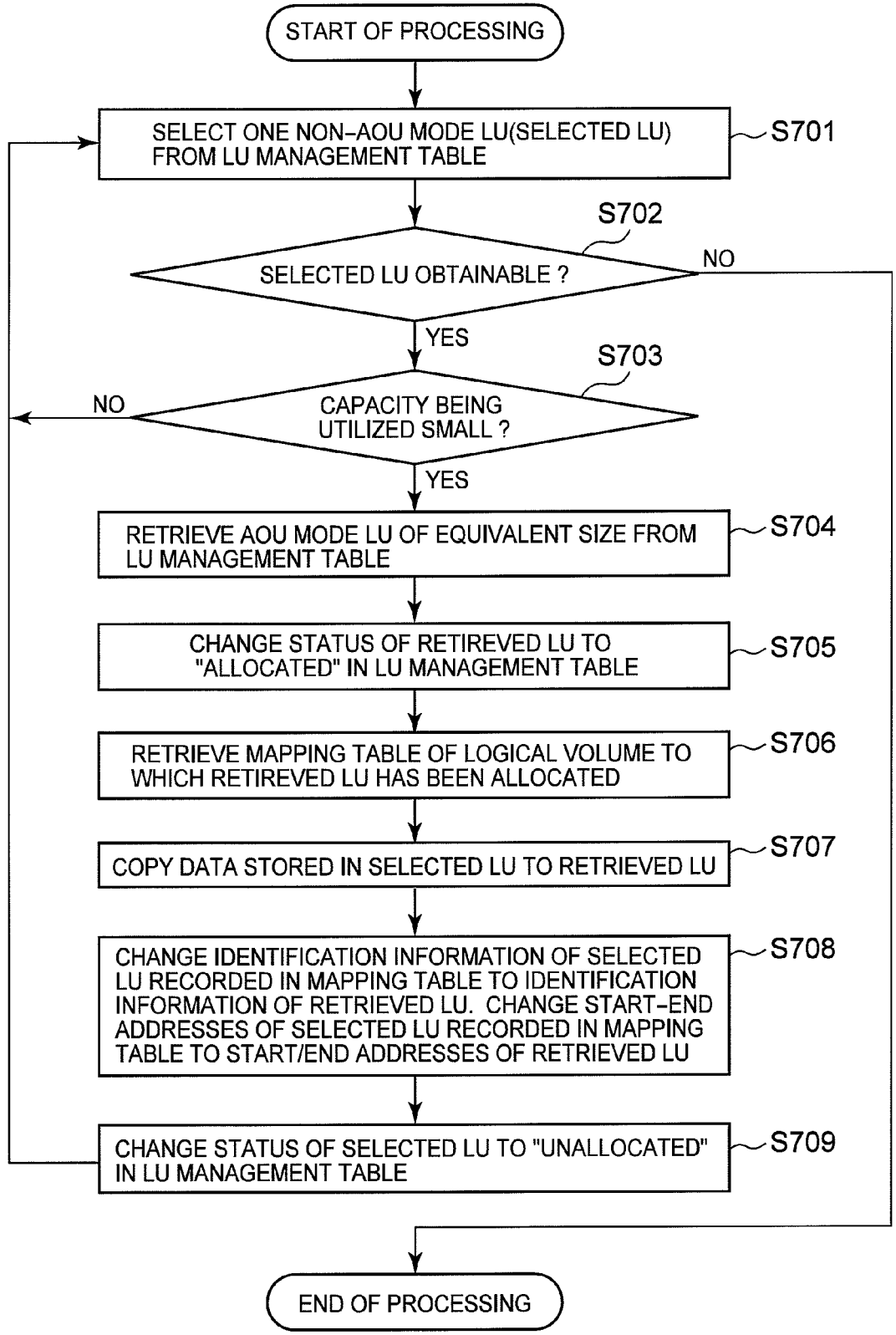
FIG. 21 is a flowchart of a second process carried out by the migration processor.

FIG. 21 is a flowchart of a second process carried out by the migration processor 224.

This processing is executed either regularly or irregularly.

First, the migration processor 224 selects one LU 421, which is a non-AOU mode LU 421 that is registered in the LU management table 252, and which has yet to be subjected to this second process (S701). Hereinafter, the LU 421 selected in S701 will be referred to as the "selected LU" in the explanation of FIG. 21.

Next, the migration processor 224 determines whether or not it was possible to obtain the selected LU (S702).

When it was not possible to obtain the selected LU (S702: No), the migration processor 224 ends processing.

Conversely, when it was possible to obtain the selected LU (S702: Yes), the migration processor 224 determines whether or not the utilization capacity of the selected LU is sufficient (S703). This determination, for example, is carried out by determining whether or not the selected LU utilization ratio (utilization capacity/selected LU size) is smaller than a prescribed threshold.

When the selected LU utilization capacity is sufficient (S703: No), the migration processor 224 carries out the processing of S701 thereafter.

Conversely, when the selected LU utilization capacity is insufficient (S703: Yes), the migration processor 224 retrieves an AOU mode LU 421 that is equivalent in size to the selected LU from the LU management table 252 (S704).

Thereafter, the migration processor 224 changes the status 515 of the LU 421 retrieved in S704 to "allocated" in the LU management table 252 (S705).

Next, the migration processor 224 retrieves the mapping table 226 of the logical volume 27 (hereinafter, referred to as the "target logical volume" in the explanation of FIG. 21) to which the LU 421 retrieved in S704 has been allocated (S706).

Next, the migration processor 224 copies the data stored in the selected LU to the LU 421 retrieved in S704 (S707).

Next, the migration processor 224 changes the identification information of the selected LU recorded in the mapping table 226 retrieved in S706 to the identification information of the LU 421 retrieved in S704. Further, the migration processor 224 changes start/end addresses 523 of the selected LU recorded in the mapping table 226 retrieved in S706 to the start/end addresses 523 of the LU 421 retrieved in S704 (S708).

Thereafter, the migration processor 224 changes the status 515 of the selected LU to "unallocated" in the LU management table 252 (S709).

Thereafter, the migration processor 224 carries out the processing of S701.

The embodiment of the present invention described hereinabove is an example for explaining the present invention, and does not purport to limit the scope of the present invention solely to this embodiment. The present invention can be put into practice in a variety of other modes without departing from the gist thereof.

In this embodiment, there are four types of LU 421 (AOU mode HDD-LU, AOU mode flash-LU, non-AOU mode HDD-LU and non-AOU mode flash-LU), but in addition to this, for example, a type that differs as to whether or not a LU 421 is provided by an externally connected storage system 4 can also be considered. Then, for example, when files considered to be for backup use (for example, files with the extension "tar") are stored often, the NAS 2 can allocate a LU 421 provided by an externally connected storage system 4 to the logical volume 27 in which these backup files are frequently stored.

What is claimed is:

1. A storage controller, which is connected to a storage system that manages a plurality of types of logical units and a client that sends a file access request, and which, based on the file access request from the client, sends to the storage system a read access request or write access request that specifies a logical unit that has been allocated to a logical volume corresponding to a file system space in which a file subjected to a target of the file access request is stored, the controller comprising:
a creation module that creates a logical volume;
a management module that manages a plurality of types of logical units including: a first type logical unit that is a logical unit associated with physical storage regions on a hard disk drive of the storage system; a second type logical unit that is a logical unit associated with virtual storage regions to which the physical storage regions are dynamically allocated in accordance with the occurrence of receiving a write request to one of the virtual storage regions to which none of the physical storage regions are allocated; a third type logical unit that is a logical unit associated with physical storage areas on a flash memory device of the storage system; and a fourth type logical unit that is a logical unit associated with virtual storage areas to which the physical storage areas are dynamically allocated in accordance with the occurrence of receiving a write request to one of the virtual storage areas to which none of the physical storage are allocated;
a measurement module that measures an access characteristic for each logical volume;
a decision module that decides a type of a logical unit to be allocated to the logical volume, based on the measured access characteristic; and
an allocation module that allocates, from among the plurality of types of logical units, a logical unit of the type decided by the decision module to the logical volume,
wherein the decision module:
(1-1) decides on the first type logical unit when a proportion of read accesses in a read/write ratio is small, and a data quantity increase rate is large;
(1-2) decides on the second type logical unit when the proportion of read accesses in the read/write ratio is small, and the data quantity increase rate is small;
(1-3) decides on the third type logical unit when the proportion of the read accesses in the read/write ratio is large, and the data quantity increase rate is large; and
(1-4) decides on the fourth type when the proportion of read accesses in the read/write ratio is large, and the data quantity increase rate is small.

2. The storage controller according to claim 1, wherein at a point in time when the logical volume is created, none of the plurality of types of logical units has been allocated,
the allocation module allocates to the logical volume, from among the plurality of types of logical units, an initial logical unit, which is a logical unit that meets a prescribed initial condition, when first write to the logical volume takes place, and
the size of the initial logical unit is smaller than the size of the logical volume, and wherein
the storage controller further comprises:
an access processor that issues to the storage system a write request for writing, to the initial logical unit, data configuring a write-targeted file when this write to the logical volume occurs,
the measuring module measures an initial access characteristic which is a characteristic related to an access to part of volume, to which the initial logical unit has been allocated, of the logical volume,
the decision module, based on the initial access characteristic, decides the type of a logical unit to be additionally allocated to part of volume other than volume part, to which the initial logical unit has been allocated, of the logical volume,
the allocation module allocates the type of logical unit decided by the decision module to the other volume part, and
the access processor, when a write occurs to the logical volume subsequent to a logical unit being additionally allocated to the logical volume, selects from among two or more types of logical units allocated to the logical volume a logical unit of the type that corresponds to the access characteristic related to this write-targeted file, and issues to the storage system a write request for writing the data configuring the write-targeted file to this selected logical unit.

3. The storage controller according to claim 2, wherein the measurement module measures the initial access characteristic until a free storage capacity of the initial logical unit is depleted, and
the decision module decides on the type of logical unit to be additionally allocated when the free storage capacity of the initial logical unit is depleted.

4. The storage controller according to claim 1, further comprising:
a migration module that carries out a migration of data from the allocated logical unit to a logical unit of the type decided by the decision module when the type of the logical unit allocated to the logical volume does not conform to the access characteristic.

5. The storage controller according to claim 1, wherein the measurement module measures data quantity increase rate, and
the decision module decides on a value obtained by multiplying the data quantity increase rate measured by the measurement module by a prescribed time as the size of the logical unit to be allocated to the logical volume.

6. The storage controller according to claim 1, wherein the allocation module:
(8-1) allocates to the logical volume a logical unit that meets a prescribed initial condition upon receiving a first write request for the logical volume; and
(8-2) allocates to the logical volume a logical unit of the type decided by the decision module when the second or subsequent write request is received for the logical volume, and when allocation of a new logical unit is required as a result of the received write request.

7. The storage controller according to claim 1, wherein the management module manages a first type logical unit and a second type logical unit, which has a faster response speed at access time, but a lower write-cycle limit value than the first type,
the measurement module measures the read/write ratio, which is a ratio of the read access amount and the write access amount, and
the decision module decides on the second type as the type of the logical unit to be allocated to the logical volume when the proportion of read accesses in the read/write ratio is large.

8. The storage controller according to claim 7, wherein the decision module decides the size of the first type logical unit and the size of the second type logical unit such that the ratio of the size of the first type logical unit and the size of the second type logical unit coincides with, or approximates the read/write ratio, and
the allocation module allocates, to the logical volume, both the first type logical unit and the second type logical unit of the sizes decided by the decision module.

9. The storage controller according to claim 7 or claim 8, wherein
the measurement module measures the number of read accesses and the number of write accesses, and defines the ratio of the measured number of read accesses and number of write accesses as the read/write ratio.

10. The storage controller according to claim 7 or claim 8, wherein the measurement module measures the total number of I/O in read accesses and the total number of I/O in write accesses, and defines the ratio of the measured total number of I/O in read accesses and total number of I/O in write accesses as the read/write ratio.

11. The storage controller according to claim 7 or claim 8, wherein
the measurement module measures the total number of files for which mainly read access is carried out and the total number of files for which mainly write access is carried out, and defines the ratio of the measured total number of files for which mainly read access is carried out and total number of files for which mainly write access is carried out as the read/write ratio.

12. The storage controller according to claim 1, wherein the management module manages a third type logical unit and a fourth type logical unit, which has higher storage resource utilization efficiency and higher throughput at write access than the third type,
the measurement module measures a data quantity increase rate, and
the decision module decides on the fourth type as the type of logical unit to be allocated to the logical volume when the data quantity increase rate measured by the measurement module is small.

13. The storage controller according to any of claims 1, 8 through 10 and 12, wherein
the measurement module measures the data quantity increase rate, and
the decision module decides on a value obtained by multiplying the data quantity increase rate measured by the measurement module by a prescribed time as the size of the logical unit to be allocated to the logical volume.

14. The storage controller according to any of claims 1, 8 through 10 and 12, further comprising:
a migration module that carries out a migration from the allocated logical unit to a logical unit of the type decided by the decision module, when the type of the logical unit allocated to the logical volume does not conform to the access characteristic.

15. A computer system, comprising:
a storage system that manages a plurality of types of logical units; and
a storage controller, which is connected to the storage system and to a client that sends a file access request, and which, on the basis of the file access request from the client, sends to the storage system a read access request or write access request that specifies a logical unit that has been allocated to a logical volume corresponding to a file system space in which is stored a file subjected to a target of the file access request,
the storage controller comprising:
a creation module that creates a logical volume;
a management module that manages a plurality of types of logical units including: a first type logical unit that is a logical unit associated with physical storage regions on a hard disk drive of the storage system; a second type logical unit that is a logical unit associated with virtual storage regions to which the physical storage regions are dynamically allocated in accordance with the occurrence of receiving a write request to one of the virtual storage regions to which none of the physical storage regions are allocated; a third type logical unit that is a logical unit associated with physical storage areas on a flash memory device of the storage system; and a fourth type logical unit that is a logical unit associated with virtual storage areas to which the physical storage areas are dynamically allocated in accordance with the occurrence of receiving a write request to one of the virtual storage areas to which none of the physical storage are allocated;

a measurement module that measures an access characteristic, which includes a read/write ratio, which is a ratio of a read access amount and a write access amount, and a data quantity increase rate;

a decision module that decides the type of a logical unit to be allocated to the logical volume based on the measured access characteristic; and an allocation module that allocates to the logical volume, from among the plurality of types of logical units, a logical unit of the type decided by the decision module, wherein the decision module:

(1-1) decides on the first type logical unit when a proportion of read accesses in the read/write ratio is small, and the data quantity increase rate is large;

(1-2) decides on the second type logical unit when the proportion of read accesses in the read/write ratio is small, and the data quantity increase rate is small;

(1-3) decides on the third type logical unit when the proportion of the read accesses in the read/write ratio is large, and the data quantity increase rate is large; and (1-4) decides on the fourth type when the proportion of read accesses in the read/write ratio is large, and the data quantity increase rate is small.

* * * * *